United States Patent
Tatsumi et al.

(10) Patent No.: US 9,264,253 B2
(45) Date of Patent: Feb. 16, 2016

(54) NETWORK SYSTEM

(75) Inventors: Tomoyoshi Tatsumi, Tsuchiura (JP); Shingo Sugawara, Tsuchiura (JP); Koichiro Seto, Amimachi (JP)

(73) Assignee: HITACHI METALS, LTD., Tokyo (JP)

( * ) Notice: Subject to any disclaimer, the term of this patent is extended or adjusted under 35 U.S.C. 154(b) by 96 days.

(21) Appl. No.: 13/550,491

(22) Filed: Jul. 16, 2012

(65) Prior Publication Data

US 2013/0021930 A1 Jan. 24, 2013

(30) Foreign Application Priority Data

Jul. 19, 2011 (JP) ................... 2011-157864

(51) Int. Cl.
*H04L 12/413* (2006.01)
*H04L 12/801* (2013.01)

(52) U.S. Cl.
CPC .................. *H04L 12/413* (2013.01)

(58) Field of Classification Search
CPC ....... H04L 12/413; H04L 47/10; H04L 43/50; H04L 12/2697
USPC .......................... 370/352, 386–392, 354–360
See application file for complete search history.

(56) References Cited

U.S. PATENT DOCUMENTS

| 6,058,116 | A  | * | 5/2000  | Hiscock et al. ............... 370/401 |
| 6,195,349 | B1 | * | 2/2001  | Hiscock et al. ............... 370/360 |
| 7,139,267 | B2 |   | 11/2006 | Lu et al. |
| 2003/0169734 | A1 | * | 9/2003 | Lu et al. ...................... 370/386 |
| 2010/0215045 | A1 | * | 8/2010 | Figueira et al. ............... 370/392 |
| 2010/0316053 | A1 | * | 12/2010 | Miyoshi et al. ............... 370/392 |
| 2011/0268118 | A1 | * | 11/2011 | Schlansker et al. .......... 370/392 |
| 2011/0305245 | A1 | * | 12/2011 | Tanaka et al. ................ 370/401 |
| 2013/0039169 | A1 | * | 2/2013 | Schlansker et al. .......... 370/225 |

FOREIGN PATENT DOCUMENTS

JP   2010-288168 A   12/2010

* cited by examiner

*Primary Examiner* — Andrew Lai
*Assistant Examiner* — M Mostazir Rahman
(74) *Attorney, Agent, or Firm* — McGinn IP Law Group, PLLC.

(57) ABSTRACT

A network system has lower switches and upper switches connected to the lower switches. Each of the upper switches includes a connection information notifying means for notifying connected lower switch list informations each of which includes an identification information on each of the lower switches connected to each of the upper switches, to the lower switches connected to each of the upper switches. Each of the lower switches includes a comparison determination means for comparing the connected lower switch list informations notified by the connection information notifying means, in order to determine a connection state between the upper switches and the lower switches.

15 Claims, 14 Drawing Sheets

| LOWER SWITCH 34a LAG TABLE ||
| LAG ID | PORT |
| --- | --- |
| 60a | 50a |
| | 50b |
| | 50c |
| | 50d |
| | 50e |
| | 50f |

54b

| IDENTIFICATION INFORMATION TABLE ||
|---|---|
| PORT | LOWER SWITCH IDENTIFICATION INFORMATION |
| 38a | 34a |
| 38b | 34a |
| 38c | 34b |
| 38d | 34b |
| 38e | 34c |
| 38f | 34c |

CONNECTION INFORMATION TABLE 54c

| PORT | CONNECTED LOWER SWITCH LIST INFORMATION | UPPER SWITCH IDENTIFICATION INFORMATION |
|---|---|---|
| 50a | 34a,34b,34c | 32a |
| 50b | 34a,34b,34c | 32a |
| 50c | 34a,34b,34c | 32b |
| 50d | 34a,34b,34c | 32b |
| 50e | 34a,34b,34c | 32c |
| 50f | 34a,34b,34c | 32c |

FIG.12

LOWER SWITCH 34a CONNECTION INFORMATION TABLE 54c

| PORT | CONNECTED LOWER SWITCH LIST INFORMATION | UPPER SWITCH IDENTIFICATION INFORMATION |
|---|---|---|
| 50a | 34a,34b | 32a |
| 50b | 34a,34b | 32a |
| 50c | 34a,34c | 32b |
| 50d | 34a,34c | 32b |

FIG.13

LOWER SWITCH 34b CONNECTION INFORMATION TABLE ~54c

| PORT | CONNECTED LOWER SWITCH LIST INFORMATION | UPPER SWITCH IDENTIFICATION INFORMATION |
|---|---|---|
| 50a | 34a,34b | 32a |
| 50b | 34a,34b | 32a |
| 50e | 34b,34c | 32c |
| 50f | 34b,34c | 32c |

FIG.14

LOWER SWITCH 34c CONNECTION INFORMATION TABLE 54c

| PORT | CONNECTED LOWER SWITCH LIST INFORMATION | UPPER SWITCH IDENTIFICATION INFORMATION |
|---|---|---|
| 50c | 34a,34c | 32b |
| 50d | 34a,34c | 32b |
| 50e | 34b,34c | 32c |
| 50f | 34b,34c | 32c |

FIG.16

CONNECTION INFORMATION TABLE 54c

| PORT | CONNECTED LOWER SWITCH LIST INFORMATION | UPPER SWITCH IDENTIFICATION INFORMATION |
|------|------------------------------------------|------------------------------------------|
| 50a  | 34a,34b                                  | 32a                                      |
| 50b  | 34a,34b                                  | 32a                                      |
| 50c  | 34a,34b                                  | 32b                                      |
| 50d  | 34a,34b                                  | 32b                                      |
| 50e  | 34a,34b,34c                              | 32c                                      |
| 50f  | 34a,34b,34c                              | 32c                                      |

NETWORK SYSTEM

The present application is based on Japanese patent application No. 2011-157864 filed on Jul. 19, 2011, the entire contents of which are incorporated herein by reference.

BACKGROUND OF THE INVENTION

1. Field of the Invention

This invention relates to a two-stage network system with two-stage connected switching hubs.

2. Description of the Related Art

Conventionally, a network system with multistage connected switches such as FAT Tree has been known. JP-A-2010-288168 discloses an example of the conventional network systems with multistage connected switches. For example, a two-stage network system includes a plurality of lower layer leaf switches (lower switches), and a plurality of upper layer root switches (upper switches). Each lower switch is connected to all the upper switches. Also, the lower switches are connected to a desired number of terminals. Transmission and reception of frames between the different lower switches is made via any one of the plural upper switches.

SUMMARY OF THE INVENTION

In the two-stage network system, it is assumed that e.g. there may occur no connection between some of the upper switches and some of the lower switches due to a fault in network cables connecting between the upper switches and the lower switches.

There is, however, a problem that checking the connection state between the upper switches and the lower switches is time-consuming for a network administrator. In particular, the work load increases with increase in number of upper switches, lower switches, and transmission mediums to connect therebetween.

In view of the above-mentioned circumstances, it is an object of the invention to provide a network system which is capable of automatically determining connection states between upper switches and lower switches.

The present invention provides a network system comprising:

lower switches; and upper switches connected to the lower switches, in which each of the upper switches includes a connection information notifying means for notifying connected lower switch list informations each of which comprises an identification information on each of the lower switches connected to each of the upper switches, to the lower switches connected to each of the upper switches, and each of the lower switches includes a comparison determination means for comparing the connected lower switch list informations notified by the connection information notifying means, in order to determine a connection state between the upper switches and the lower switches.

The comparison determination means may determine that all the upper switches are connected to all the lower switches, when all the connected lower switch list informations notified from the different upper switches match each other.

The comparison determination means may extract all the identification informations contained in the connected lower switch list informations, and determines whether or not at least one of the connected lower switch list informations contains all the extracted identification informations, and the comparison determination means may determine such a connection state that there is no upper switch connected to all the lower switches, when there is no connected lower switch list information containing all the extracted identification informations.

The connection information notifying means may comprise a connection information notification frame generating portion for generating a connection information notification frame containing the connected lower switch list information.

Each of the lower switches may include an identification information notifying means for notifying the identification information on each of the lower switches to the upper switches.

The identification information notifying means may comprise an identification information notification frame generating portion for generating an identification information notification frame containing the identification information on each of the lower switches.

Each of the upper switches and the lower switches may comprise a switching hub.

Effects of the Invention

According to the embodiment of the invention, the network system capable of automatically determining connection states between upper switches and lower switches is provided.

BRIEF DESCRIPTION OF THE DRAWINGS

The preferred embodiments according to the invention will be explained below referring to the drawings, wherein:

FIG. 9 is a table showing connection information table contents in FIG. 4;

FIG. 12 is a table showing connection information table contents in a lower switch in FIG. 11;

FIG. 13 is a table showing connection information table contents in a lower switch in FIG. 11;

FIG. 14 is a table showing connection information table contents in a lower switch in FIG. 11;

FIG. 16 is a table showing connection information table contents in a lower switch in FIG. 15.

DETAILED DESCRIPTION OF THE PREFERRED EMBODIMENTS

Figure 1:
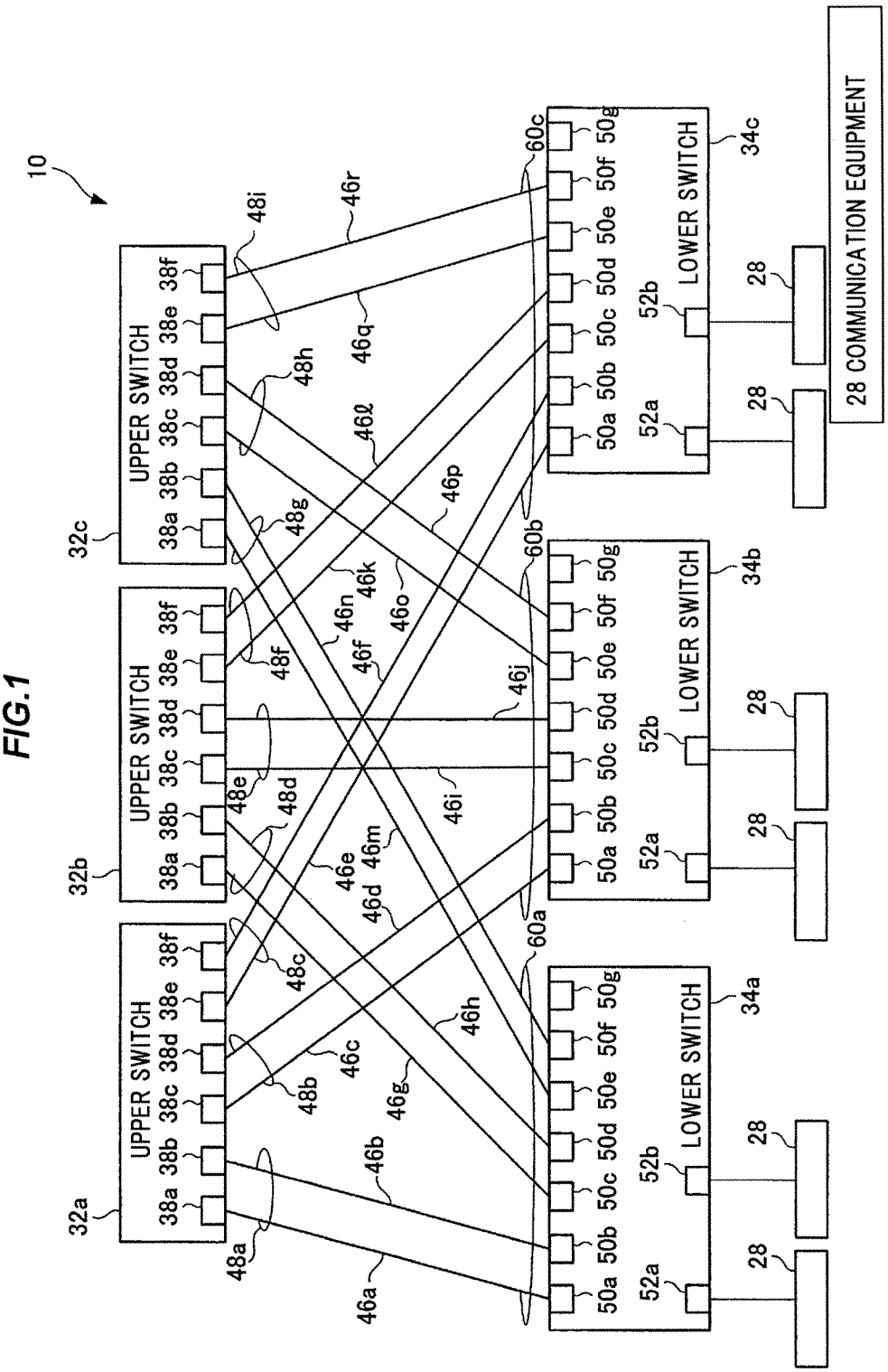
FIG. 1 is a schematic diagram showing a configuration of a network system in one embodiment.

Next, embodiments according to the invention will be described in conjunction with the appended drawings. FIG. 1 is a diagram illustrating a network system 10 in the first embodiment.

The network system 10 is a two-stage network system with two-stage connected switching hubs. The switching hubs comprise a plurality of lower switches and a plurality of upper switches connected to the lower switches. Namely, the switching hubs are classified into the lower switches and the upper switches connected to the lower switches. The network system 10 in one embodiment shown in FIG. 1 comprises three upper switches 32a, 32b, 32c and three lower switches 34a, 34b, 34c. It should be noted that the network system 10 in one embodiment shown in FIG. 1 is shown as one example, but the numbers of the upper switches and lower switches are not limited thereto. The upper switches 32a, 32b, 32c and the lower switches 34a, 34b, 34c are switching hubs with e.g. layer 2 data forwarding function in an OSI (Open Systems Interconnection) reference model, and each of which is provided with data forwarding function for layer 3 etc. as required. In one embodiment, the upper switches 32a, 32b, 32c and the lower switches 34a, 34b, 34c are box-type switching hubs.

The lower switches 34a, 34b, 34c are connected to the upper switches 32a, 32b, 32c and to external communication equipments 28 for the network system 10. The communication equipments 28 are specifically a server, a switching hub, a router, and the like.

The lower switches 34a, 34b, 34c have a plurality of ports. Of the plural ports of the lower switches 34a, 34b, 34c, ports 50a, 50b are connected to an upper switch 32a, ports 50c, 50d are connected to an upper switch 32b, ports 50e, 50f are connected to an upper switch 32c, and ports 48a, 48b are connected to the communication equipments 28. In the lower switches, LAGs are configured for the ports connected to the upper switches. Specifically, LAGs 60a, 60b, 60c are configured for the plural ports 50a, 50b, 50c, 50d, 50e, 50f connected to the upper switches, of the plural ports of the lower switches 34a, 34b. The link aggregation is a technique to treat plural lines logically as one line. The plural ports for which LAGs are configured operate logically as one port. The upper switches 32a, 32b, 32c have plural ports. Of the plural ports of the upper switches 32a, 32b, 32c, the ports 38a, 38b are connected to the lower switch 34a, the ports 38c, 38d are connected to the lower switch 34b, and the ports 38e, 38f are connected to the lower switch 34c.

In the upper switches, the LAG is configured for the plural ports connected to the same lower switch. Specifically, for the case of the upper switch 32a, a LAG 48a is configured for the ports 38a, 38b connected to the lower switch 34a, a LAG 48b is configured for the ports 38c, 38d connected to the lower switch 34b, and a LAG 48c is configured for the ports 38e, 38f connected to the lower switch 34c.

The network system in the embodiment of the invention is characterized in that operation is performed to automatically determine connection states between the upper switches and the lower switches.

Next, configurations of the upper switches and lower switches will be described below. Herein, the "upper switches 32a, 32b, 32c" are also referred to collectively as "upper switch 32" and the "lower switches 34a, 34b, 34c" are also referred to collectively as "lower switch 34." (Upper switch)

Figure 2:
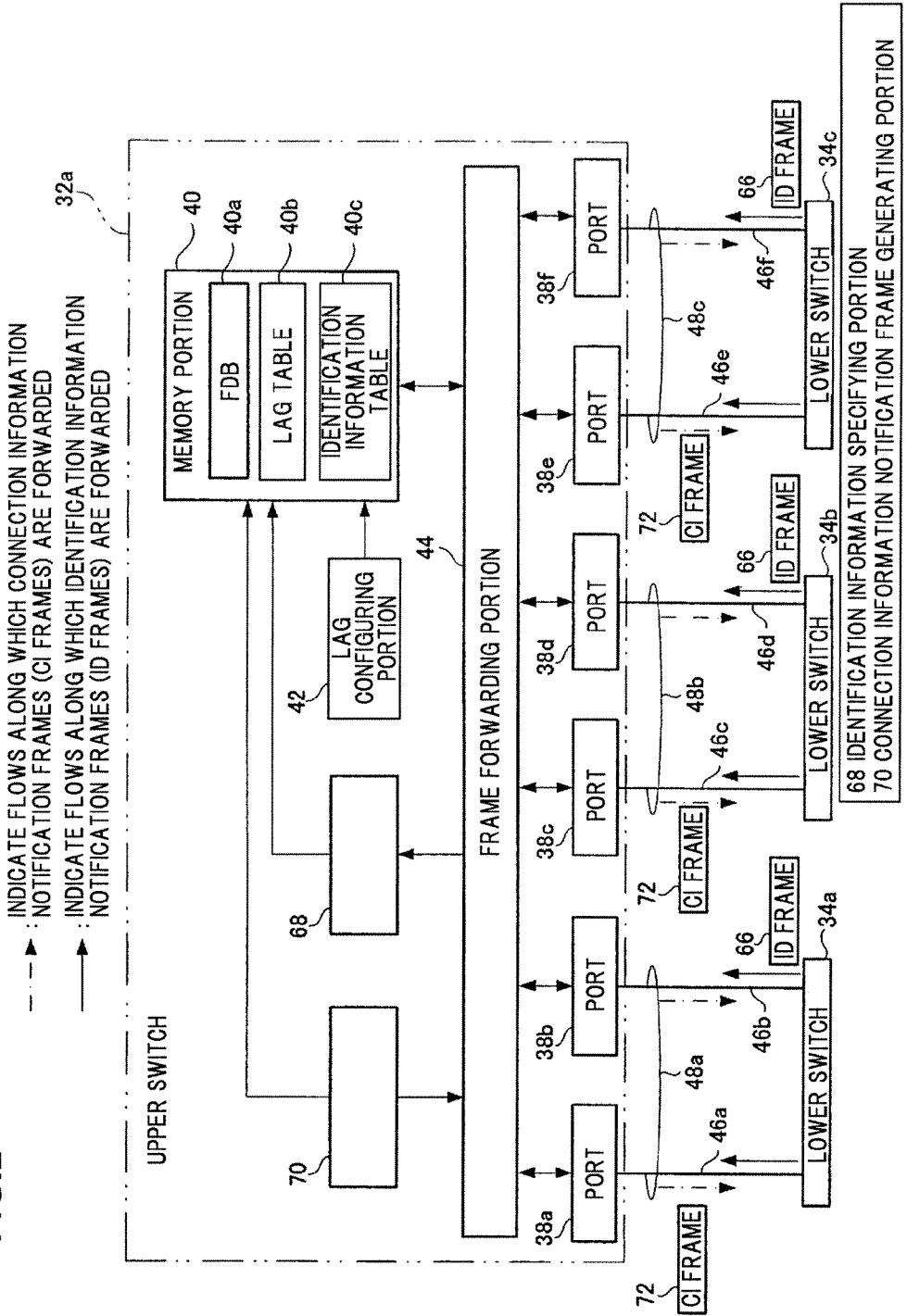
FIG. 2 is a block diagram schematically showing a functional configuration of an upper switch in FIG. 1.

FIG. 2 is a block diagram schematically showing a functional configuration of the upper switch 32a shown in FIG. 1. Incidentally, the functional configurations of the upper switches 32b, 32c shown in FIG. 1 are the same as that of the switch 32a, and the descriptions of the upper switches 32b, 32c are omitted. The upper switch 32a has the plural ports 38a, 38b, 38c, 38d, 38e, 38f, a memory portion 40, a LAG configuring portion 42, and a frame forwarding portion 44.

In FIG. 2, each arrow indicated by broke line indicates a flow along which a connection information notification frame (CI frame) is forwarded, and each arrow indicated by solid line indicates a flow along which an identification information notification frame (ID frame) is forwarded. The same arrows are used in following drawings.

(Memory Portion)

The memory portion 40 is formed of e.g. a volatile rewritable RAM (random access memory). The memory portion 40 stores an FDB (forwarding database) 40a and a LAG table 40b. (Port)

The ports 38a, 38b, 38c, 38d, 38e, 38f are connected to the lower switches 34, and are compatible with full-duplex communication. Specifically, in the upper switch 32a shown in FIG. 2, the ports 38a, 38b are connected to the lower switch 34a via network cables 46a, 46b as transmission mediums. The ports 38c, 38d are connected to the lower switch 34b via network cables 46c, 46d. The ports 38e, 38f are connected to the lower switch 34c via network cables 46e, 46f. Likewise, the upper switches 32b, 32c are also connected to the lower switches 34 via network cables. The network cables connecting the upper switches 32b, 32c and the lower switches 34 are provided with reference numerals 46g, 46h, 46i, 46j, 46k, 46l, 46m, 46n, 46o, 46q, 46r.

Herein, the "ports 38a, 38b, 38c, 38d" are also referred to collectively as "port 38," and the "network cables 46g, 46h, 46i, 46j, 46k, 46l, 46m, 46n, 46o, 46q, 46r" are also referred to collectively as "network cable 46." The number of ports 38 is not limited to the number shown in the figure.

(LAG Configuring Portion)

The LAG configuring portion 42 creates and updates the LAG table 40b, based on a command from an administrator, for example. By using the LAG table 40b, the LAG configuring portion 42 configures LAG(s) for the ports 38 connected to the same lower switch 34.

(LAG Table)

Figure 3:
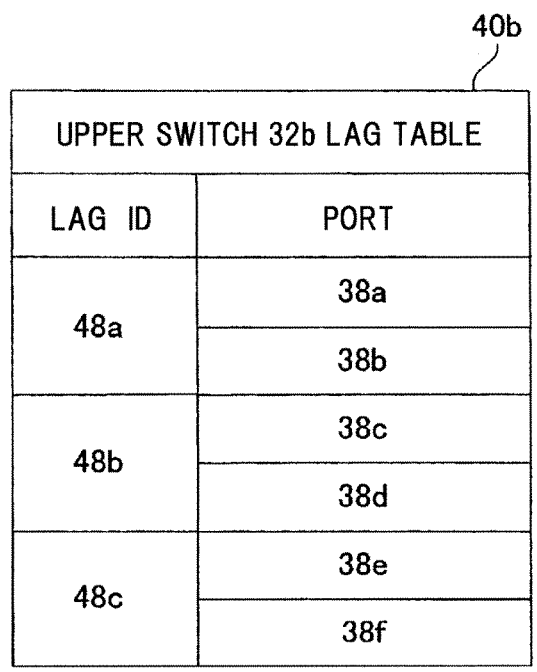
FIG. 3 is a table showing LAG table contents of an upper switch in FIG. 1.

FIG. 3 is a table showing the contents of the LAG table 40b of the upper switch 32a. The LAG table 40b mutually associates and registers the port number of the port 38 and a LAG identification information (LAGID).

Specifically, the ports 38a, 38b connected to the lower switch 34a and the LAG 48a are mutually associated and registered, the ports 38c, 38d connected to the lower switch 34b and the LAG 48b are mutually associated and registered, and the ports 38e, 38f connected to the lower switch 34c and the LAG 48b are mutually associated and registered.

Similarly, in the upper switches 32b, 32c, LAGs are configured. The LAGs configured in the upper switches 32b, 32c are provided with reference numerals 48c, 48d, 48e, 48f, 48g, 48i.

Herein, "LAGs 48a, 48b, 48c, 48d, 48e, 48f, 48g, 48i" are also referred to collectively as "LAGs 48." Each LAG 48 may contain one or more ports 38.

Incidentally, in FIG. 3, reference numerals are shown as identification informations on the LAGs 48.

(Frame Forwarding Portion)

The frame forwarding portion 44 is realized by e.g. an integrated circuit such as an FPGA (Field Programmable Gate Array) or an ASIC (Application Specific Integrated Circuit).

The frame forwarding portion 44 forwards frames by referring to the FDB 40a and the LAG table 40b. In other words, the frame forwarding portion 44 forwards the frames received by the ports 38, based on a destination address in each of the frames, to the ports 38 to which the frames are to be transmitted.

Specifically, when transmitting a user frame to the lower switch 34a, the frame forwarding portion 44 refers to the LAG table 40b, and transmits it from any one of the ports 38a, 38b belonging to the LAG 48a. Similarly, when transmitting a user frame to the lower switch 34b, the frame forwarding portion 44 transmits it from any one of the ports 38c, 38d belonging to the LAG 48b, and when transmitting the user frame to the lower switch 34c, the frame forwarding portion 44 transmits it from any one of the ports 38e, 38f belonging to the LAG 48c.

Also, the frame forwarding portion 44 creates and updates the FDB 40a based on a source address information in the frame. The FDB 40a mutually associates and registers the source address information in the frame received in the port 38, and the port number of the received port 38.

(Lower Switch)

Figure 4:
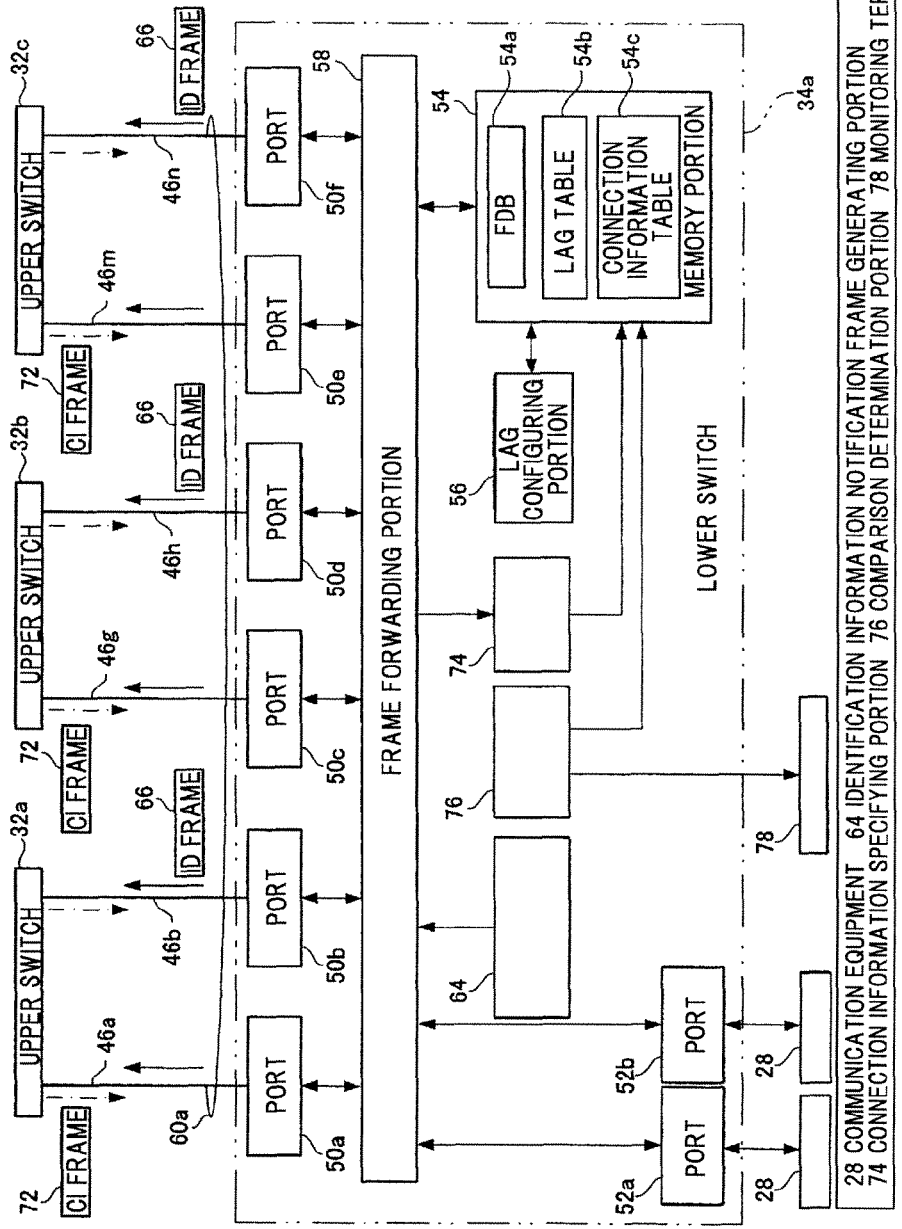
FIG. 4 is a block diagram schematically showing a functional configuration of a lower switch in FIG. 1.

FIG. 4 is a block diagram schematically showing a functional configuration of the lower switch 34a. Incidentally, the configurations of the lower switches 34b, 34c shown in FIG. 1 are the same as that of the lower switch 34a, and the descriptions thereof are omitted.

The lower switch 34a has the plural ports 50a, 50b, 50c, 50d, 50e, 50f, 52a, 52b, a memory portion 54, a LAG configuring portion 56, and a frame forwarding portion 58.

The memory portion 54 is formed of e.g. a RAM, and stores a FDB 54a, and a LAG table 54b.

(Port)

The ports 50a, 50b, 50c, 50d, 50e, 50f are connected to the upper switches 32. Specifically, in the lower switch 34a, the ports 50a, 50b are connected to the upper switch 32a through the network cables 46a, 46b. The ports 50c, 50d are connected to the upper switch 32b via the network cables 46g, 46h. The ports 50e, 50f are connected to the upper switch 32c via the network cables 46m, 46n. The ports 52a, 52b are connected to the communication equipments 28 outside the network system 10.

Herein, the "ports 50a, 50b, 50c, 50d, 50e, 50f" are also referred to collectively as "port 50" and the "ports 52a, 52b" are also referred to collectively as "port 52." The number of ports 50 and 52 is not limited to the illustrated number. Also, each of the ports 50 is compatible with full-duplex communication.

(LAG Configuring Portion)

The LAG configuring portion 56 creates and updates the LAG table 54b, based on a command from the administrator, for example. By using the LAG table 54b, the LAG configuring portion 56 configures LAG(s) for the ports 50 connected to the upper switches 32.

(LAG Table)

Figures 5, 6:
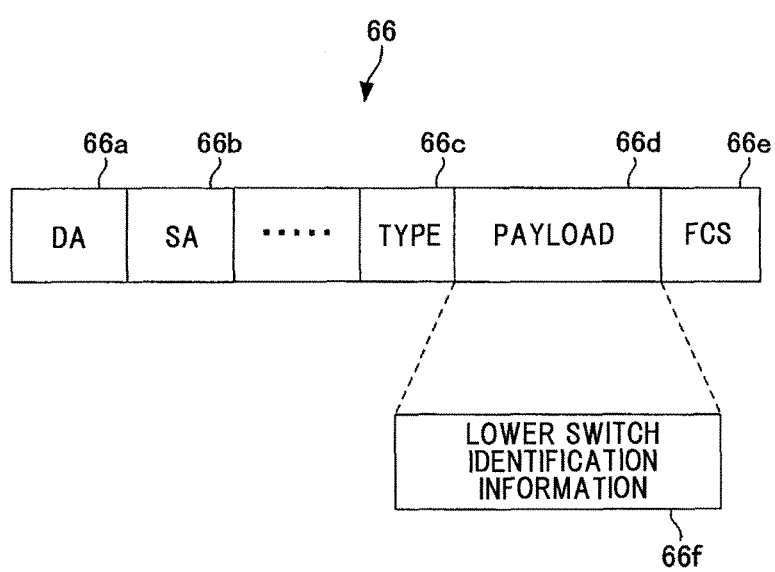
FIG. 5 is a table showing LAG table contents in FIG. 4.
FIG. 6 is a diagram showing a format of an identification information notification frame.

FIG. 5 is a table showing the contents of the LAG table 54b. The LAG table 54b mutually associates and registers the port number of the port 50 and a LAG identification informations (LAGID). Specifically, for the plural ports 50 connected to the upper switches 32, a LAG 60a is configured.

Similarly, in the lower switches 34b, 34c, LAGs are configured. The LAGs configured in the lower switches 34b, 34c are provided with reference numerals 60b, 60c. Herein, the "LAGs 60a, 60b, 60c" are also referred to collectively as "LAG 60." Incidentally, in FIG. 5, reference numerals are shown as identification informations on the LAGs 60.

(Frame Forwarding Portion)

The frame forwarding portion 58 is realized by e.g. an integrated circuit such as ASIC or FPGA. By referring to the FDB 54a and the LAG table 54b, the frame forwarding portion 58 forwards the frames received by the ports 50 or 52, based on a destination address in each of the frames, to the ports 50 or 52 to which the frames are to be transmitted.

Also, the frame forwarding portion 58 creates and updates the FDB 54a based on a source address information in each of the frames. The FDB 54a mutually associates and registers the source address information in the frame received by the port 50 or 52, and the port number of the received port 50 or 52.

Here, in order to determine connection states between the upper switches 32 and the lower switches 34 in the network system 10, the network system 10 in one embodiment includes an identification information notifying means, a connection information notifying means, and a comparison determination means.

(Identification Information Notifying Means)

Referring again to FIG. 4, the lower switch 34a further includes an identification information notification frame generating portion 64 as the identification information notifying means. The identification information notification frame generating portion 64 generates identification information notification frames (ID frames) 66.

(Identification Information Notification Frame)

The identification information notification frame 66 is a frame to be transmitted for the lower switch 34a to notify an identification information assigned to the lower switch 34a to the upper switches 32 connected to the lower switch 34a.

FIG. 6 illustrates a format of the identification information notification frame 66. The identification information notification frame 66 includes a plurality of fields, and specifically include a DA (destination address) field 66a, an SA (source address) field 66b, a TYPE field 66c, a payload field 66d, and an FCS field 66e.

The DA field 66a stores a multicast address having e.g. a forwarding range for the upper switch 32. The SA field 66b stores a MAC (Media Access Control) address assigned to the lower switches 34 of the source. The TYPE field 66c stores an identifier indicating that the frame is the identification information notification frame 66. The FCS field 66e stores a checksum code.

Also, the payload field 66d stores data, and in one embodiment, stores a lower switch identifying information (identification information) 66f assigned to each of the lower switches 34 that are the sources of the identification information notification frames 66.

The lower switch identification information 66f is e.g. information for identifying the lower switch 34, such as MAC address, IP (Internet Protocol) address and the like that are assigned to the lower switch 34.

When the identification information notification frame 66 is generated by the identification information notification frame generating portion 64, the frame forwarding portion 58 transmits the identification information notification frame 66 from each of the ports 50 simultaneously to all the upper switches 32 connected to the lower switch 34a. The identification information notification frames 66 transmitted from the respective ports 50 are received by the upper switches 32 through the network cables 46. Incidentally, the identification information notification frames 66 are repeatedly transmitted at regular or irregular intervals.

(Connection Information Notifying Means)

Referring again to FIG. 2, the upper switch 32a further includes an identification information specifying portion 68, a connection information notification frame generating portion 70, an identification information table 40c stored in the memory portion 40, as the connection information notifying means.

The identification information notification frame 66 transmitted from the lower switch 34 is received by the port 38, and forwarded via the frame forwarding portion 44, to the identification information specifying portion 68.

The identification information specifying portion 68 reads the lower switch identification information 66$f$ contained in the identification information notification frame 66, creates and updates the identification information table 40$c$ based on the read lower switch identification information 66$f$.

(Identification Information Table)

Figures 7, 8:
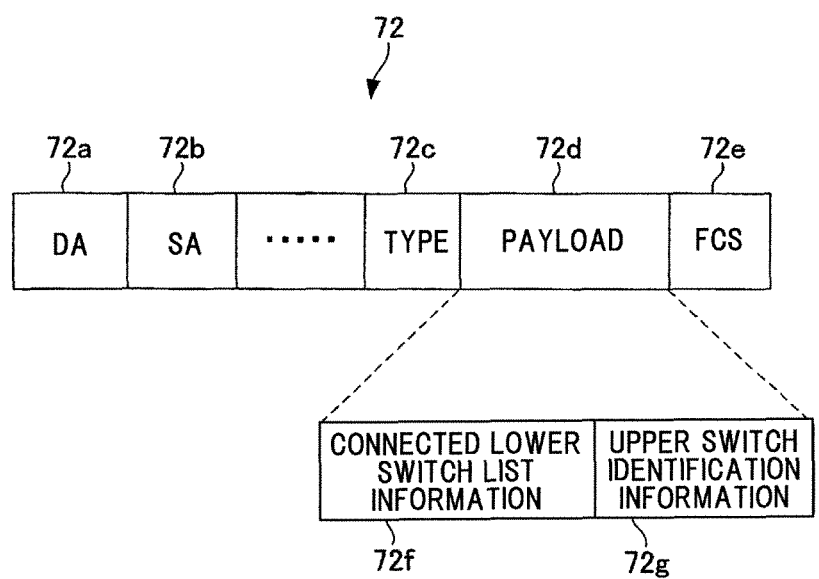
FIG. 7 is a table showing identification information table contents of the upper switch in FIG. 2.
FIG. 8 is a diagram showing a format of a connection information notification frame in FIG. 4.

FIG. 7 is a table showing the contents of the identification information table 40$c$. The identification information table 40$c$ mutually associates and registers the port number of the port 38 having received the identification information notification frame 66, and the lower switch identification information 66$f$ contained in the identification information notification frame 66. Incidentally, in FIG. 7, as the port numbers of the ports 38, respective reference numerals of the ports 38 are used. Also, as the lower switch identification informations 66$f$, respective reference numerals of the lower switches 34 are used.

The connection information notification frame generating portion 70 generates a connection information notification frame (CI frame) 54, based on the lower switch identification information 66$f$ registered in the identification information table 40$c$.

(Connection Information Notification Frame)

FIG. 8 shows a format of the connection information notification frame 72. The connection information notification frame 72 contains a DA field 72$a$, an SA field 72$b$, a TYPE field 72$c$, a payload field 72$d$, and, an FCS field 72$e$.

The DA field 72$a$ stores a multicast address having e.g. a forwarding range for the lower switch 34, and the SA field 72$b$ stores a MAC (Media Access Control) address assigned to the upper switch 32 of the source.

The TYPE field 72$c$ stores an identifier indicating that the frame is the connection information notification frame 72. The FCS field 72$e$ stores a checksum code.

The payload field 72$d$ contains a connected lower switch list information 72$f$, and an upper switch identification information 72$g$.

The upper switch identification information 72$g$ is an identification information on the upper switch 32 which is the source of the connection information notification frame 72, such as MAC address, IP address, and the like.

The connected lower switch list information 72$f$ is a list of the lower switch identification information 66$f$ registered in the identification information table 40$c$. Therefore, the connected lower switch list information 72$f$ includes one or more of the lower switch identification informations 66$f$.

The connection information notification frame 72 generated by the connection information notification frame generating portion 70 is transmitted from the port 38 to all the lower switches 34$a$, 34$b$, 34$c$ connected to the upper switch 32$a$ via the frame forwarding portion 44. Incidentally, the connection information notification frames 72 are repeatedly transmitted at regular or irregular intervals.

(Comparison Determination Means)

Referring again to FIG. 4, the lower switch 34 further includes a connection information specifying portion 74, a comparison determination portion 76, and a connection information table 54$c$ stored in the memory portion 54, as the comparison determination means.

(Connection Information Specifying Portion)

The connection information notification frame (CI frame) 72 transmitted from the upper switch 32 is received by the port 50 of the lower switch 34$a$, and forwarded via the frame forwarding portion 58, to the connection information specifying portion 74.

The connection information specifying portion 74 reads the connected lower switch list information 72$f$ and the upper switch identification information 72$g$ contained in the connection information notification frame 72. The connection information specifying portion 74 registers in the connection information table 54$c$ the read connected lower switch list information 72$f$ and the read upper switch identification information 72$g$ in association with the received port 50.

(Connection Information Table)

FIG. 9 shows the contents of the connection information table 54$c$. The connection information table 54$c$ associates and registers the port number of the port 50, the connected lower switch list information 72$f$ and the upper switch identification information 72$g$.

(Comparison Determination Portion)

The comparison determination portion 76 compares the connected lower switch list informations 72$f$ notified by the upper switches 32, in order to determine the connection states between the lower switches 34 and the upper switches 32.

Incidentally, in this comparison, the connection information table 54$c$ compares the connected lower switch list informations 72$f$ registered in association with the different upper switches 32.

(Connection State Determination)

Such a connection state in the network system 10 is assumed that some of the upper switches are not connected to some of the lower switches. In such a connection state, because the upper switches that are not connected to some of the lower switches are not used in user frame forwarding, bands of all the upper switches of the network system 10 are not effectively utilized.

Herein, such a connection state that some of the upper switches are not connected to some of the lower switches is defined as "incompletely connected state," while such a state that each of all the upper switches is connected to all the lower switches is defined as "completely connected state."

Also, such a connection state in the network system 10 is assumed that there is no upper switch connected to all the lower switches within the network system 10. In such a connection state, a zone in which no user frame can be forwarded between some of the lower switches occurs for all the upper switches.

Herein, such a connection state that there is no upper switch connected to all the lower switches is defined as "communication disabled state," while such a connection state that there is one or more upper switches connected to all the lower switches is defined as "communication enabled state."

As a result of comparing the connected lower switch list informations 72$f$ registered in the connection information table 54$c$, when all the connected lower switch list informations 72$f$ notified from the different upper switches 32 match each other, the comparison determination portion 76 determines that the network system 10 is in the completely connected state.

On the other hand, when there is a mismatch between the registered connected lower switch list informations 72$f$, the comparison determination portion 76 determines that the network system 10 is in the incompletely connected state.

Also, the comparison determination portion 76 extracts all the lower switch identification informations 66$f$ contained in the connected lower switch list informations 72$f$ in the connection information table 54$c$. Next, the comparison determination portion 76 determines whether or not at least one of the connected lower switch list informations 72$f$ registered in the connection information table 54$c$ contains all the lower switch identification informations 66$f$ extracted.

If even one connected lower switch list information 72f containing all the extracted lower switch identification informations 66f is being registered in the connection information table 54c, the comparison determination portion 76 determines that the network system 10 is in the communication enabled state.

On the other hand, if even one connected lower switch list information 72f containing all the extracted lower switch identification informations 66f is being not registered in the connection information table 54c, the comparison determination portion 76 determines that the network system 10 is in the communication disabled state.

And, in one embodiment, as a preferred embodiment, the comparison determination portion 76 notifies a determined result to a monitoring terminal 78. As a method to notify the determined result to the monitoring terminal 78, an SNMP (Simple Network Management Protocol) trap function for example can be used. The determined result notified is output to a monitor of the monitoring terminal 78, so that the administrator can take necessary action such as additional wiring and the like based on the determined result output to the monitor.

Incidentally, the comparison determination portion 76 may notify or not notify that effect to the monitoring terminal 78, in the event of being unable to make a determination.

Next, operations of the network system 10 in one embodiment will be described as set forth.

OPERATION EXAMPLE 1

A Case of a Completely Connected State

Figure 10:
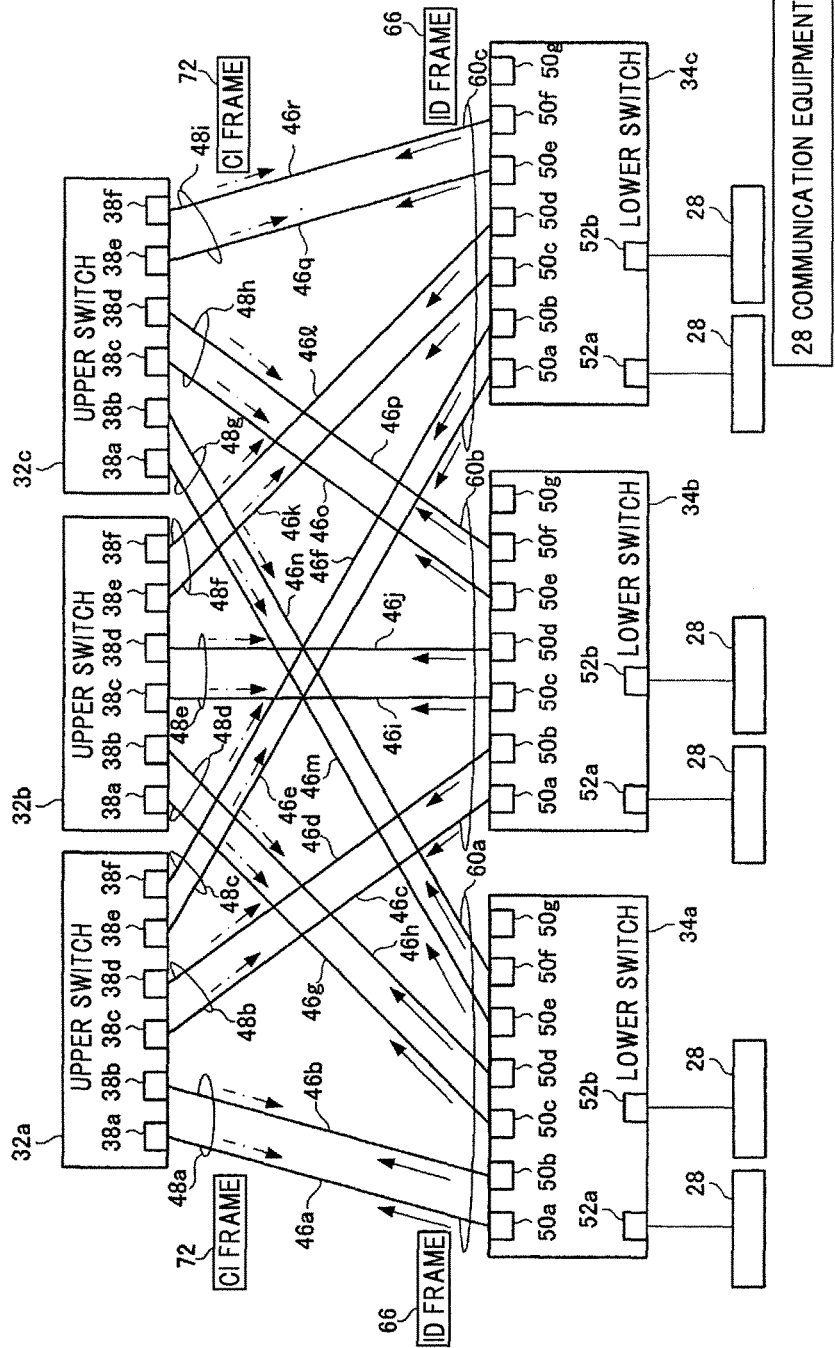
FIG. 10 is a diagram for explaining an operation example 1 of the network system in one embodiment.

FIG. 10 is a diagram for explaining an operation example 1 of the network system 10. The network system 10 shown in FIG. 10 is in such a completely connected state that all the upper switches 32 are connected to all the lower switches 34.

The lower switches 34a, 34b, 34c transmit the identification information notification frames 66 to the upper switches 32a, 32b, 32c.

The upper switches 32a, 32b, 32c receive the identification information notification frames 66, and register the lower switch identification informations 66f on the lower switches 34a, 34b, 34c into the identification information table 40c. Based on the lower switch identification informations 66f registered in the identification information table 40c, the upper switches 32a, 32b, 32c generate the connection information notification frames 72 containing the upper switch identification informations 72g and the connected lower switch list informations 72f, and transmit them to the lower switches 34a, 34b, 34c.

The lower switches 34a, 34b, 34c receive the connection information notification frames 72, associate and register the ports 50 having received the connection information notification frames 72, the connected lower switch list informations 72f and the upper switch identification informations 72g, into the connection information table 54c.

As shown in FIG. 9, the connection information table 54c registered in the lower switch 34a registers "34a, 34b, 34c" as the connected lower switch list informations 72f and "32a" as the upper switch identification information 72g, in association with the ports 50a, 50b. Also, the connection information table 54c registers "34a, 34b, 34c" as the connected lower switch list informations 72f and "32b" as the upper switch identification information 72g, in association with the ports 50c, 50d. Also, the connection information table 54c registers "34a, 34b, 34c" as the connected lower switch list informations 72f and "32c" as the upper switch identification information 72g, in association with the ports 50e, 50f.

(Connection State Determination)

The comparison determination portion 76 of the lower switch 34a determines connection states, based on the connected lower switch list informations 72f and the upper switch identification informations 72g registered in the connection information table 54c.

The connected lower switch list informations 72f registered in association with each of "32a," "32b," and "32c" as the upper switch identification information 72g in the connection information table 54c are all "34a, 34b, 34c" and match each other.

Therefore, the comparison determination portion 76 of the lower switch 34a determines that it is in the completely connected state, and notifies the determined result to the monitoring terminal 78.

Also, the connected lower switch list informations 72f registered in the connection information table 54c of the lower switches 34b, 34c are all "34a, 34b, 34c," and match each other. Therefore, the comparison determination portion 76 of the lower switches 34b, 34c notifies the determined result indicative of the completely connected state to the monitoring terminal 78.

Incidentally, in the case of the completely connected state, because of the communication enabled state, no communication state determination may be made.

OPERATION EXAMPLE 2

A Case of an Incompletely Connected State and a Communication Disabled State

Figure 11:
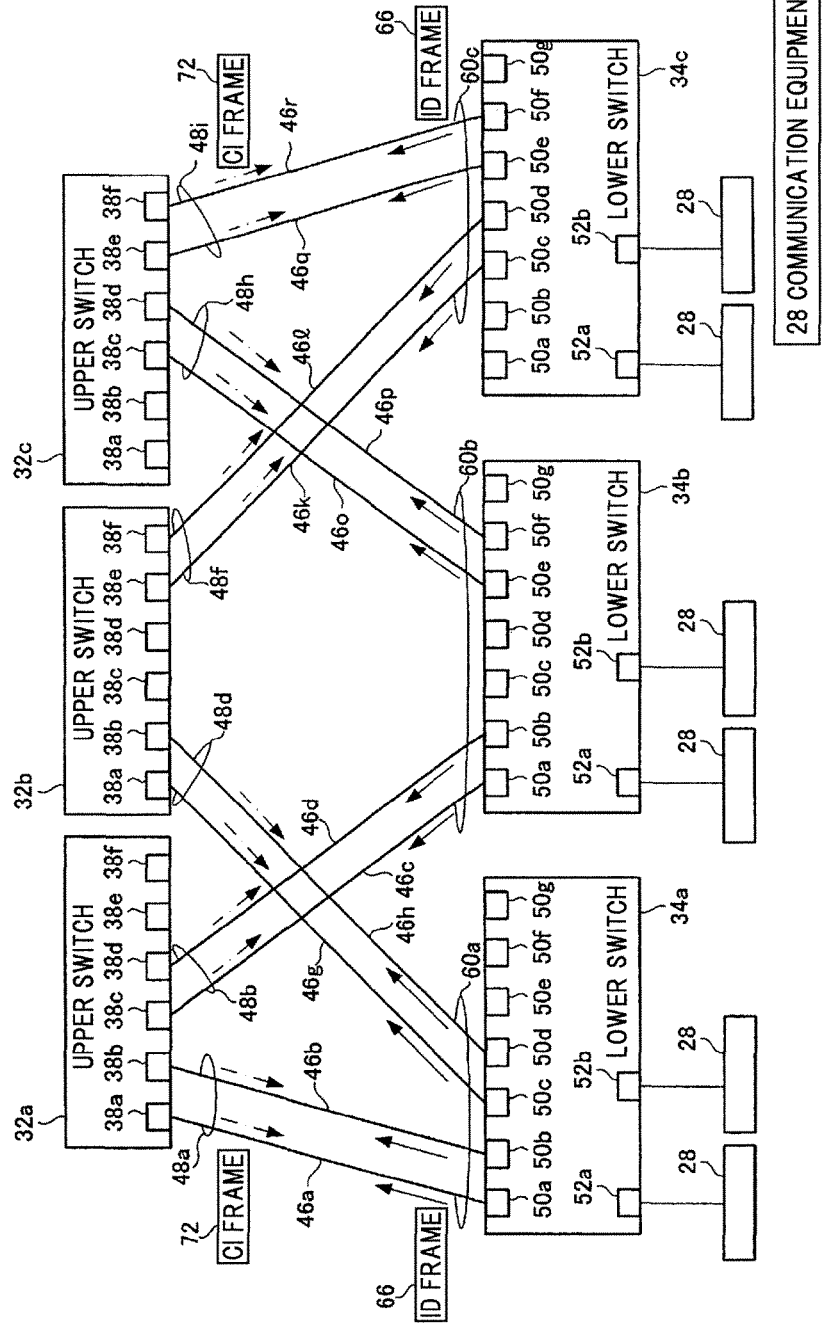
FIG. 11 is a diagram for explaining an operation example 2 of the network system in one embodiment.

FIG. 11 is a diagram for explaining the operation example 2 of the network system 10. The network system 10 shown in FIG. 11 is in such an incompletely connected state that some of the upper switches are not connected to some of the lower switches, and in such a communication disabled state that there is no upper switch connected to all the lower switches.

Specifically, in the network system 10 shown in FIG. 11, the upper switch 32a is connected to the lower switches 34a, 34b, and the upper switch 32b is connected to the lower switches 34a, 34c, and the upper switch 32c is connected to the lower switches 34b, 34c.

(Connection State Determination)

FIGS. 12, 13 and 14 each show the contents of the connection information table 54c registered in the lower switches 34a, 34b, 34c.

In the connection information table 54c of FIG. 12, because "34a, 34b," which are the connected lower switch list informations 72f registered in association with "32a" as the upper switch identification information 72g, and "34a, 34c," which are the connected lower switch list informations 72f registered in association with "32b" as the upper switch identification information 72g, do not match each other, the comparison determination portion 76 of the lower switch 34a determines that it is in the incompletely connected state.

Next, the comparison determination portion 76 of the lower switch 34a extracts the "34a," "34b," and "34c" from the connected lower switch list informations 72f registered in the connection information table 54c shown in FIG. 12. The comparison determination portion 76 determines whether or not the connected lower switch list informations 72f containing all of the "34a," "34b," and "34c" are being registered in the connection information table 54c. In this operation example, the determined result is no, and the comparison determination portion 76 of the lower switch 34a determines that the network system 10 is in the communication disabled state.

Similarly, the comparison determination portion 76 of each of the lower switches 34b, 34c also determines that it is in the incompletely connected state and the communication disabled state.

Then, the comparison determination portion 76 of each of the lower switches 34 notifies the determined result to the monitoring terminal 78.

OPERATION EXAMPLE 3

A Case of the Incompletely Connected State and the Communication Enabled State

Figure 15:
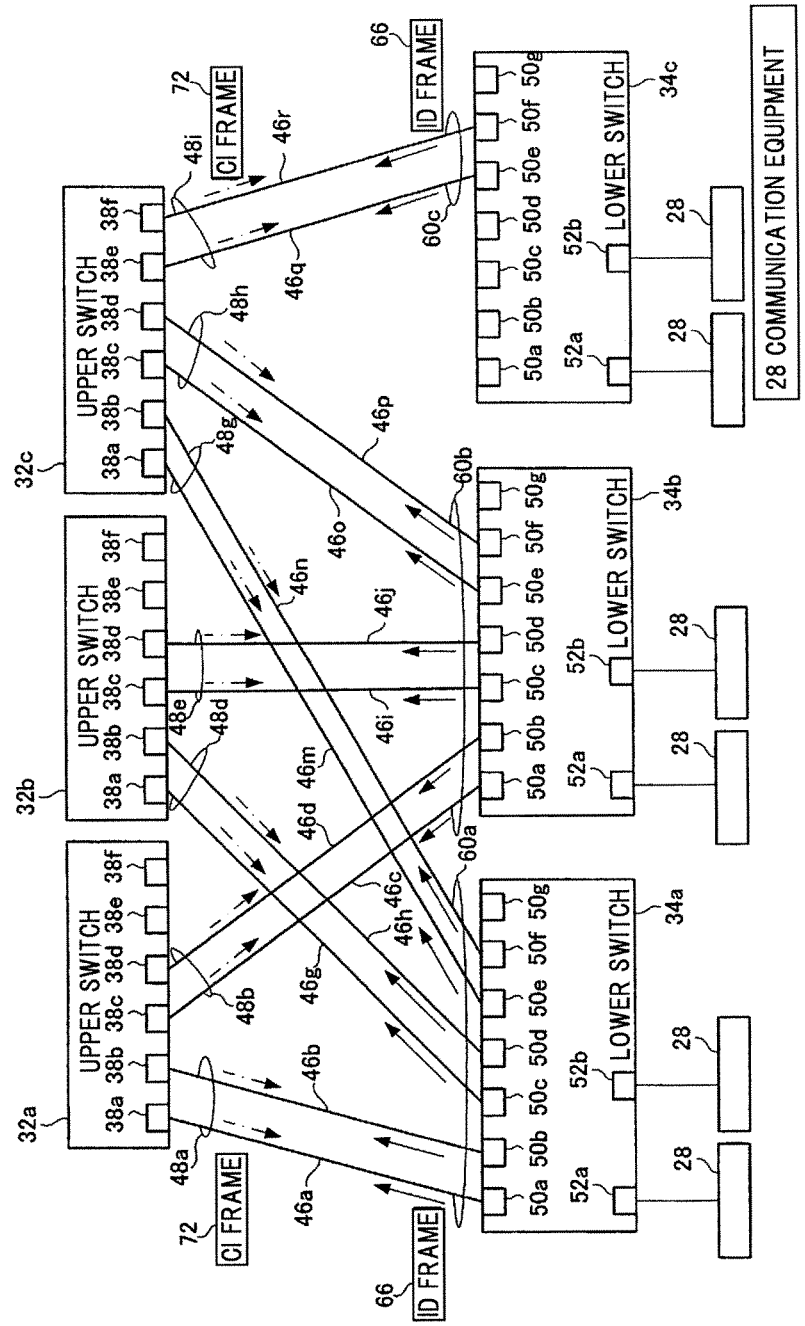
FIG. 15 is a diagram for explaining an operation example 3 of the network system in one embodiment.

FIG. 15 is a diagram for explaining the operation example 3 of the network system 10. The network system 10 shown in FIG. 15 is in such an incompletely connected state that some of the upper switches are not connected to some of the lower switches, and in such a communication enabled state that there is one or more upper switches connected to all the lower switches.

In the network system 10 shown in FIG. 15, the upper switches 32a, 32b are connected to the lower switches 34a, 34b. The upper switch 32c is connected to the lower switches 34a, 34b, 34c. That is, the upper switches 32a, 32b are not connected to the lower switch 34c.

(Connection State Determination)

Each of the lower switches 34a, 34b creates a connection information table 54c shown in FIG. 16. In the connection information table 54c, "34a, 34b" as the connected lower switch list informations 72f registered in association with "32a" or "32b" as the upper switch identification information 72g, and "34a, 34b, 34c" as the connected lower switch list informations 72f registered in association with "32c" as the upper switch identification information 72g do not match each other. For this, the comparison determination portion 76 of each of the lower switches 34a, 34b determines that the network system 10 is in the incompletely connected state.

Next, the comparison determination portion 76 of each of the lower switches 34a, 34b extracts the "34a," "34b," and "34c" from among the connected lower switch list informations 72f registered in the connection information table 54c in FIG. 16. In the connection information table 54c, the connected lower switch list informations 72f registered in association with "32c" as the upper switch identification information 72g contain all the "34a," "34b," and "34c," as the lower switch identification information 66f. Therefore, the comparison determination portion 76 of the lower switch 34 determines that the network system 10 is in the communication enabled state.

Further, the comparison determination portion 76 of each of the lower switches 34a, 34b notifies the determined result to the monitoring terminal 78.

It should be noted that the comparison determination portion 76 of the lower switch 34c performs no comparison and determination operation for connection states, because there is only one "32c" as the upper switch identification informations 72g registered in the connection information table 54c (not shown).

The network system 10 in one embodiment described above operates as follows: The upper switch 32 notifies the connected lower switch list information 72f to all the lower switches 34 connected to the upper switch 32, and the lower switch 34 compares the connected lower switch list informations 72f notified from each of the upper switches 32 in order to determine connection states between the lower switches 34 and the upper switches 32. This network system 10 can, based on compared results, automatically determine connection states between the lower switches 34 and the upper switches 32.

For this reason, the administrator of the network system 10 may, if desired, add or correct wiring, based on determined connection state results, without time-consuming wiring inspection.

According to the network system 10 in one embodiment described above, the comparison determination portion 76 of the lower switch 34 determines whether or not the connected lower switch list informations 72f registered in the connection information table 54c in association with the different upper switch identification informations 72g match each other. According to this structure, the comparison determination portion 76 of the lower switch 34 can determine whether the network system 10 is either in a completely connected state or in an incompletely connected state.

According to the network system 10 in one embodiment described above, the comparison determination portion 76 of the lower switch 34 can determine whether or not at least one of the connected lower switch list informations 72f registered in the connection information table 54c contains all the extracted lower switch identification informations 66f. According to this structure, the comparison determination portion 76 of the lower switch 34 can determine whether the network system 10 is either in a communication enabled state or in a communication disabled state.

According to the network system 10 of one embodiment described above, the lower switch 34 notifies determined results to the monitoring terminal 78. According to this structure, the administrator of the network system 10 can easily know the determined results.

The invention is not limited to one embodiment described above, but embodies various modifications to one embodiment.

Although in one embodiment described above the connection information notification frame 72 contains the connected lower switch list information 72f and the upper switch identification information 72g, the format of the connection information notification frame 72 is not limited to that shown in FIG. 8. For example, if the lower switch 34 can identify the upper switch 32 based on the source address of the connection information notification frame 72, the payload field 72d of the connection information notification frame 72 may contain no upper switch identification information 72g.

In one embodiment described above, the identification information specifying portion 68 of the upper switch 32 creates the identification information table 40c, based on the identification information notification frames 66 received from the lower switches 34. As a modification, the identification information table 40c may be created by the administrator manually entering the lower switch identification informations 66f for the lower switches 34.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein configured forth.

What is claimed is:

1. A network system, comprising:
   lower switches; and
   upper switches to be connected to the lower switches,
   wherein each of the upper switches generates a connection information notification frame containing connected lower switch list information and transmits the connection information notification frame to all the lower switches connected to said each of the upper switches, the connected lower switch list information comprising identification information on each of all the lower switches connected to said each of the upper switches, and wherein each of the lower switches receives the connection information notification frame transmitted from each of the upper switches and compares the connected lower switch list information with each other, in order to determine whether or not all the upper switches are actually connected to all the lower switches, wherein said each of the upper switches comprises:

an identification information table that mutually associates and registers a port number of a port of the upper switches that receives an identification information notification frame transmitted from the lower switches, and lower switch identification information contained in the identification information notification frame; and a link aggregation group (LAG) table that mutually associates and registers the port number of the port of the upper switches and an LAG identification information (LAGID).

2. The network system according to claim 1, wherein said each of the lower switches determines that all the upper switches are actually connected to all the lower switches, when all the connected lower switch list information notified from different upper switches match each other.

3. The network system according to claim 1, wherein said each of the lower switches extracts all the identification information contained in the connected lower switch list information, and determines whether or not at least one of the connected lower switch list information contains all the extracted identification information, and wherein said each of the lower switches determines such a connection state that there is no upper switch connected to all the lower switches, when there is no connected lower switch list information containing all the extracted identification information.

4. The network system according to claim 2, wherein said each of the lower switches extracts all the identification information contained in the connected lower switch list information, and determines whether or not at least one of the connected lower switch list information contains all the extracted identification information, and wherein said each of the lower switches determines such a connection state that there is no upper switch connected to all the lower switches, when there is no connected lower switch list information containing all the extracted identification information.

5. The network system according to claim 1, wherein said each of the lower switches sends the identification information on said each of the lower switches to the upper switches.

6. The network system according to claim 5, wherein said each of the lower switches generates the identification information notification frame containing the identification information on each of the lower switches and transmits the identification information notification frame to the upper switches.

7. The network system according to claim 6, wherein said each of the upper switches reads the lower switch identification information contained in the identification information notification frame, and creates and updates the identification information table based on the read lower switch identification information.

8. The network system according to claim 7, wherein said each of the upper switches generates the connection information notification frame based on the lower switch identification information registered in the identification information table.

9. The network system according to claim 1, wherein each of the upper switches and the lower switches comprises a switching hub.

10. The network system according to claim 1, wherein said each of the lower switches comprises:

a connection information table that associates and registers a port number of a port of the lower switches, the connected lower switch list information, and upper switch identification information.

11. The network system according to claim 10, wherein said each of the lower switches reads the connected lower switch list information and the upper switch identification information contained in the connection information notification frame.

12. The network system according to claim 11, wherein said each of the lower switches registers, in the connection information table, the read connected lower switch list information and the read upper switch identification information in association with the port of the lower switches.

13. The network system according to claim 12, wherein the connection information table compares the connected lower switch list information registered in association with different upper switches.

14. The network system according to claim 13, wherein said each of the lower switches determines the network system is in a completely connected state when all the connected lower switch list information notified from the different upper switches match each other.

15. The network system according to claim 14, wherein, when there is a mismatch between the registered connected lower switch list information, said each of the lower switches determines that the network system is in an incompletely connected state.

* * * * *